United States Patent
Laird et al.

(10) Patent No.: US 12,428,983 B2
(45) Date of Patent: Sep. 30, 2025

(54) VEHICLE EXHAUST ASSEMBLIES AND METHODS THEREFOR

(71) Applicant: The Braun Corporation, Winamac, IN (US)

(72) Inventors: Michael Laird, Indianapolis, IN (US); Christopher Wegner, Winamac, IN (US); Parker Fox, Winamac, IN (US)

(73) Assignee: The Braun Corporation, Winamac, IN (US)

( * ) Notice: Subject to any disclaimer, the term of this patent is extended or adjusted under 35 U.S.C. 154(b) by 190 days.

(21) Appl. No.: 17/840,803

(22) Filed: Jun. 15, 2022

(65) Prior Publication Data

US 2022/0412245 A1  Dec. 29, 2022

Related U.S. Application Data (60) Provisional application No. 63/214,526, filed on Jun. 24, 2021.

(51) Int. Cl.

| | | |
|---|---|---|
| *F01N 13/18* | (2010.01) | |
| *B01D 53/94* | (2006.01) | |
| *F01N 1/00* | (2006.01) | |
| *F01N 3/02* | (2006.01) | |
| *F01N 3/28* | (2006.01) | |

(52) U.S. Cl.
CPC ......... *F01N 13/1805* (2013.01); *B01D 53/94* (2013.01); *F01N 1/003* (2013.01); *F01N 3/0205* (2013.01); *F01N 3/28* (2013.01)

(58) Field of Classification Search
CPC ........ F01N 13/1805; F01N 1/003; F01N 3/28; F01N 3/0205; B01D 53/94
USPC .......................................................... 180/309
See application file for complete search history.

(56) References Cited

U.S. PATENT DOCUMENTS

| | | | | |
|---|---|---|---|---|
| 3,798,904 | A * | 3/1974 | Gleason .................. | F01N 13/08 60/320 |
| 4,345,430 | A * | 8/1982 | Pallo ..................... | F16L 59/187 60/299 |
| 5,702,276 | A * | 12/1997 | Nakase ..................... | F01N 3/05 440/89 R |
| 5,988,308 | A * | 11/1999 | Qutub .................. | F01N 13/1811 180/309 |
| 6,260,652 | B1 * | 7/2001 | Steenackers ............ | F01N 13/08 60/322 |
| 2002/0049015 | A1 * | 4/2002 | Suzuki ................ | F01N 13/1805 440/89 C |
| 2013/0240284 | A1 * | 9/2013 | Ajisaka ................. | F01N 3/2046 180/309 |
| 2019/0055875 | A1 * | 2/2019 | Fang ........................ | F01N 3/10 |
| 2019/0120103 | A1 * | 4/2019 | Jentz ..................... | F01N 3/0205 |

* cited by examiner

*Primary Examiner* — Mark A Laurenzi
*Assistant Examiner* — Kelsey L Stanek
(74) *Attorney, Agent, or Firm* — Daniel Tallitsch; Tyler Schultz (57) ABSTRACT

Exhaust assemblies for vehicles and methods of installing exhaust systems on vehicles are disclosed. An exhaust assembly for a vehicle includes an exhaust inlet to receive combustion products from a drive unit, a catalytic converter to control emissions from combustion products received by the exhaust system, and a first piping assembly coupled to the exhaust inlet and the catalytic converter.

23 Claims, 5 Drawing Sheets

VEHICLE EXHAUST ASSEMBLIES AND METHODS THEREFOR

CROSS-REFERENCE TO RELATED APPLICATIONS

This application claims priority to U.S. Provisional Patent Application No. 63/214,526, filed on Jun. 24, 2021, the content of which is incorporated herein by reference.

FIELD OF THE DISCLOSURE

The present disclosure relates, generally, to exhaust systems for vehicles, and, more specifically, to exhaust systems for gas-powered vehicles.

BACKGROUND

Exhaust systems for vehicles powered by one or more internal combustion engines or drive units are typically mounted on the underside of vehicles and configured to conduct combustion products away from the engine(s) or drive unit(s) through various components of the exhaust systems before being discharged at outlets thereof. The clearance between the underside of a particular vehicle and the ground may dictate the arrangement and positioning of exhaust system components on the vehicle. In addition, that clearance may dictate fluidic and/or piping interconnections between exhaust system components. Provision of exhaust systems that retain at least some conventional components and meet ground clearance requirements remains an area of interest.

SUMMARY

The present disclosure may comprise one or more of the following features and combinations thereof.

According to one aspect of the present disclosure, an exhaust system for a vehicle may include an exhaust inlet to receive combustion products from a drive unit, a catalytic converter to control emissions from combustion products received by the exhaust system, and a first piping assembly coupled to the exhaust inlet and the catalytic converter. The first piping assembly may include a flexible tube and at least one conduit coupled thereto that cooperate to at least partially define a first loop between the exhaust inlet and the catalytic converter. The at least one conduit may have one section that at least partially extends downwardly in a vertical direction from the flexible tube and another section that at least partially extends upwardly in the vertical direction from the one section to the catalytic converter.

In some embodiments, the exhaust system may include a heat exchanger to extract heat from combustion products received by the exhaust system and a second piping assembly coupled to the catalytic converter and the heat exchanger that includes at least one conduit that at least partially defines a second loop between the catalytic converter and the heat exchanger. The at least one conduit of the second piping assembly may have one section that at least partially extends upwardly in the vertical direction from the catalytic converter and another section that at least partially extends downwardly in the vertical direction from the one section of the at least one conduit of the second piping assembly to the heat exchanger.

In some embodiments, the catalytic converter may be positioned at least partially above the exhaust inlet in the vertical direction. The catalytic converter may be positioned at least partially above the heat exchanger in the vertical direction.

In some embodiments, the exhaust system may include a sensor to measure oxygen contents of combustion products passed through the first piping assembly that is affixed to the one section of the at least one conduit of the first piping assembly. Additionally, in some embodiments, the exhaust system may not include a resonator.

In some embodiments, the exhaust system may include a muffler to reduce sound associated with combustion products received by the exhaust system and a third piping assembly coupled to the muffler and the heat exchanger, and a service point that provides access to the exhaust system for servicing and/or maintenance may be located on at least one conduit of the third piping assembly. The exhaust system may not include a resonator that is positioned between the service point and an exhaust outlet of the exhaust system. Additionally, in some embodiments, the at least one conduit of the third piping assembly may include one section that at least partially extends along, and is arranged at least partially parallel to, a linear axis between the heat exchanger and the muffler, and the service point may be located on the one section of the at least one conduit of the third piping assembly. The at least one conduit of the third piping assembly may include another section coupled between the one section of the at least one conduit of the third piping assembly and the muffler, and the another section of the at least one conduit of the third piping assembly may not be arranged parallel to the linear axis. The third piping assembly may include a flexible tube coupled between the another section of the at least one conduit of the third piping assembly and the muffler.

According to another aspect of the present disclosure, an exhaust system for a vehicle may include an exhaust inlet to receive combustion products from a drive unit, a catalytic converter to control emissions from combustion products received by the exhaust system, a first piping assembly coupled to the exhaust inlet and the catalytic converter, a heat exchanger to extract heat from combustion products received by the exhaust system, and a second piping assembly coupled to the catalytic converter and the heat exchanger. The catalytic converter may be positioned at least partially above the exhaust inlet in a vertical direction. The first piping assembly may include a flexible tube and at least one conduit coupled thereto that cooperate to at least partially define a first loop between the exhaust inlet and the catalytic converter. The first loop may at least partially extend downwardly in the vertical direction from the exhaust inlet and upwardly in the vertical direction to the catalytic converter. The heat exchanger may be positioned at least partially below the catalytic converter in the vertical direction. The second piping assembly may include at least one conduit that at least partially defines a second loop between the catalytic converter and the heat exchanger. The second loop may at least partially extend upwardly from the catalytic converter in the vertical direction and downwardly in the vertical direction to the heat exchanger.

In some embodiments, the exhaust system may not include a resonator. Additionally, in some embodiments, the exhaust system may include a sensor to measure oxygen contents of combustion products passed through the first piping assembly, and the sensor may be affixed to the first piping assembly downstream of the flexible tube on a section of the first loop that at least partially extends downwardly in the vertical direction.

In some embodiments, the exhaust system may include a muffler to reduce sound associated with combustion products received by the exhaust system and a third piping assembly coupled to the muffler and the heat exchanger, and a first service point that provides access to the exhaust system for servicing and/or maintenance may be located on at least one conduit of the third piping assembly. A second service point that provides access to the exhaust system for servicing and/or maintenance may be located in close proximity to the exhaust inlet and upstream of the flexible tube of the first piping assembly. Additionally, in some embodiments, the at least one conduit of the third piping assembly may include one section that at least partially extends along, and is arranged at least partially parallel to, a linear axis between the heat exchanger and the muffler, and the first service point may be located on the one section of the at least one conduit of the third piping assembly. The at least one conduit of the third piping assembly may include another section coupled between the one section of the at least one conduit of the third piping assembly and the muffler, and the another section of the at least one conduit of the third piping assembly may not be arranged parallel to the linear axis. The third piping assembly may include a flexible tube coupled between the another section of the at least one conduit of the third piping assembly and the muffler.

According to yet another aspect of the present disclosure, a method of installing an exhaust system on a vehicle may include coupling an exhaust inlet of the exhaust system to a drive unit of the vehicle, arranging a catalytic converter of the exhaust system relative to the exhaust inlet such that the catalytic converter is at least partially positioned above the exhaust inlet in a vertical direction, coupling the catalytic converter to the exhaust inlet by a first piping assembly defining a first loop between the exhaust inlet and the catalytic converter that at least partially extends downwardly in the vertical direction from the exhaust inlet and upwardly in the vertical direction to the catalytic converter, arranging a heat exchanger of the exhaust system relative to the catalytic converter such that the heat exchanger is at least partially positioned below the catalytic converter in the vertical direction, and coupling the heat exchanger to the catalytic converter by a second piping assembly defining a second loop between the heat exchanger and the catalytic converter that at least partially extends upwardly from the catalytic converter in the vertical direction and downwardly in the vertical direction to the heat exchanger.

In some embodiments, the method may include coupling the heat exchanger to a muffler of the exhaust system by a third piping assembly such that a first service point that provides access to the exhaust system for servicing and/or maintenance is located on at least one conduit of the third piping assembly. The method may include coupling a fourth piping assembly that at least partially defines an exhaust outlet of the exhaust system to the muffler. Coupling the fourth piping assembly to the muffler may not include interposing a resonator between the muffler and the exhaust outlet of the exhaust system. Additionally, in some embodiments, the method may include locating a first service point that provides access to the exhaust system for servicing and/or maintenance in close proximity to the exhaust inlet and upstream of a flexible tube of the first piping assembly.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Figure 1:
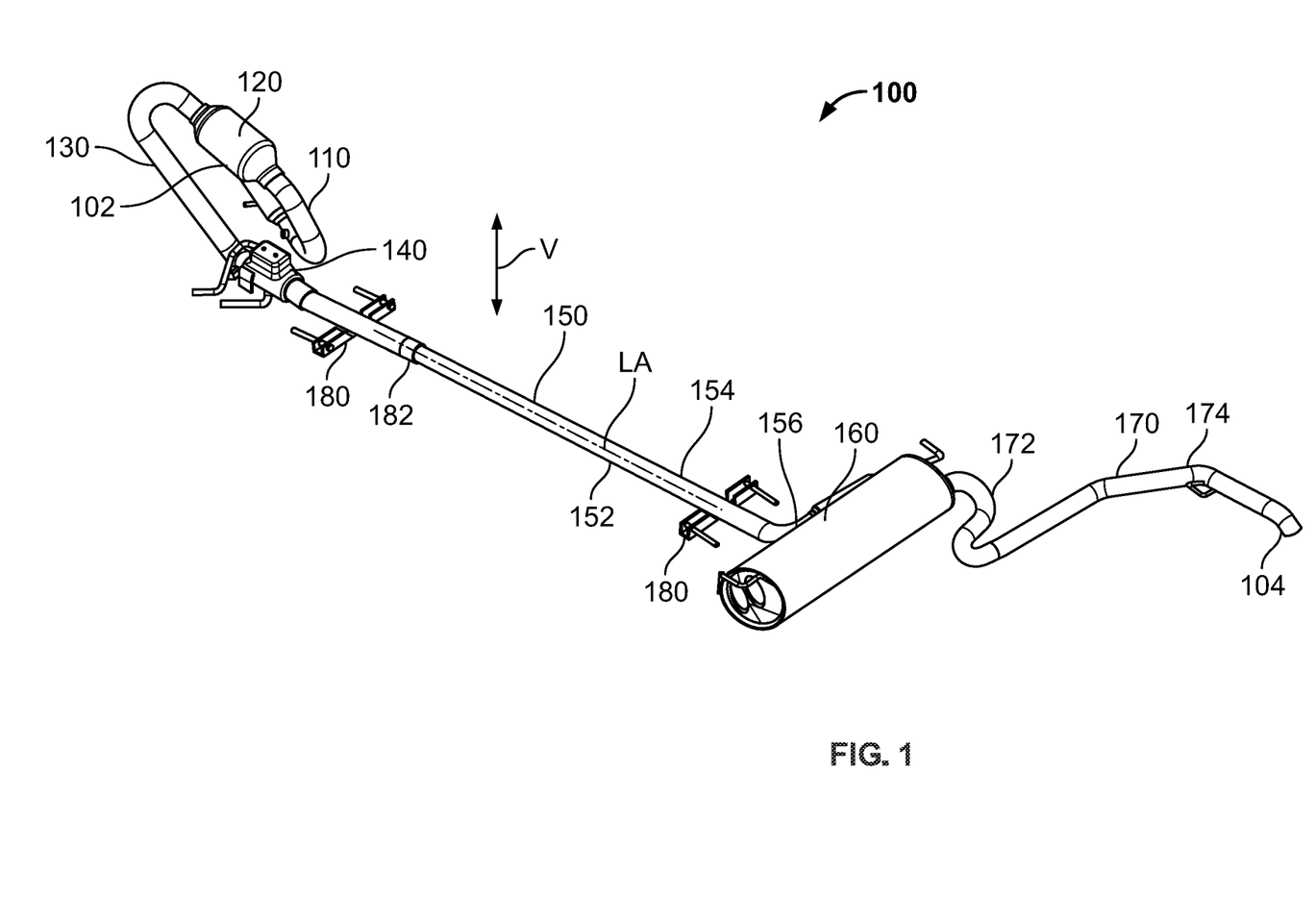
FIG. 1 is a perspective view of a vehicle exhaust system of the present disclosure.

Referring now to FIG. 1, an illustrative exhaust system 100 for a vehicle extends from an exhaust inlet 102 to an exhaust outlet 104 arranged opposite the exhaust inlet 102. The exhaust inlet 102 is configured to receive combustion products (e.g., combustion gasses) from an internal-combustion drive unit, engine, power plant, or the like of the vehicle. The exhaust outlet 104 is configured to discharge combustion products passed through the exhaust system 100 as emissions from a vehicle.

In the illustrative embodiment, the exhaust system 100 includes a piping assembly 110, a catalytic converter 120, a piping assembly 130, a heat exchanger 140, a piping assembly 150, a muffler 160, and a piping assembly 170. The piping assembly 110 is coupled to the exhaust inlet 102 and the catalytic converter 120 to conduct combustion products from the exhaust inlet 102 to the catalytic converter 120. The catalytic converter 120 is configured to control emissions from the combustions products received by the exhaust system 100. The piping assembly 130 is coupled to the catalytic converter 120 and the heat exchanger 140 to conduct combustion products from the catalytic converter 120 to the heat exchanger 140. The heat exchanger 140 is configured to extract heat from the combustion products received by the exhaust system 100 that may be used to warm other components of the vehicle during certain conditions, such as an engine and/or fuel delivery system during startup of the vehicle, for example. The piping assembly 150 is coupled to the heat exchanger 140 and the muffler 160 to conduct combustion products from the heat exchanger 140 to the muffler 160. The muffler 160 is configured to reduce sound associated with combustion products received by the exhaust system 100. The piping assembly 170 is coupled to the muffler 160 and the exhaust outlet 104 to conduct combustion products from the muffler 160 to the exhaust outlet 104.

The illustrative piping assembly 110 includes a collection of components that cooperate to at least partially define a loop 212 (see FIG. 2) between the exhaust inlet 102 and the catalytic converter 120. In the illustrative embodiment, the loop 212 at least partially extends downwardly in a vertical direction V from the exhaust inlet 102 and upwardly in the vertical direction V to the catalytic converter 120. The piping assembly 110 interconnects the exhaust inlet 102 and the catalytic converter 120 such that the catalytic converter 120 is positioned at least partially above the exhaust inlet 102 in the vertical direction V, at least in the illustrative embodiment. In some embodiments, when the exhaust system 100 is installed on a vehicle (e.g., mounted on an underside of a chassis or frame of the vehicle), the catalytic converter 120 may be located farther from the ground in the vertical direction V than the exhaust inlet 102 due at least in part to the interconnection provided by the piping assembly 110. In other embodiments, however, the exhaust inlet 102 may be located farther from the ground in the vertical direction V than the catalytic converter 120 when the exhaust system 100 is installed on a vehicle.

The illustrative piping assembly 130 includes a collection of components that cooperate to at least partially define a loop 232 (see FIG. 2) between the catalytic converter 120 and the heat exchanger 140. In the illustrative embodiment, the loop 232 at least partially extends upwardly from the catalytic converter 120 in the vertical direction V and downwardly in the vertical direction V to the heat exchanger 140. The piping assembly 130 interconnects the catalytic converter 120 and the heat exchanger 140 such that the catalytic converter 120 is positioned at least partially above the heat exchanger 120 in the vertical direction V, at least in the illustrative embodiment. In some configurations, due at least in part to the interconnection provided by the piping assembly 130, the catalytic converter 120 may be located farther from the ground in the vertical direction V than the heat exchanger 140 when the exhaust system 100 is installed on a vehicle. In other configurations, however, the heat exchanger 140 may be located farther from the ground in the vertical direction V than the catalytic converter 120 when the exhaust system 100 is installed on a vehicle.

In some embodiments, provision of the piping assemblies 110, 130 between the exhaust inlet 102 and the catalytic converter 120 and the catalytic converter 120 and the heat exchanger 140, respectively, may facilitate compliance with certain ground clearance requirements. Additionally, in some embodiments, provision of the piping assemblies 110, 130 may maintain one or more linear distances between individual components of the exhaust system 100 and a reference point, such as a service or maintenance point, for example. In some cases, provision of the piping assemblies 110, 130 may maintain one linear distance and/or one range of linear distances between the catalytic converter 120 and a reference point and another linear distance and/or another range of linear distances between the heat exchanger 140 and a reference point.

The illustrative piping assembly 150 includes one or more components that establish a fluidic coupling between the heat exchanger 140 and the muffler 160. A conduit 152, or a collection of conduits 152, of the piping assembly 150 has a section 154 and a section 156. In the illustrative embodiment, the section 154 of the conduit 152 at least partially extends along, and is arranged at least partially parallel to, a linear axis LA between the heat exchanger 140 and the muffler 160. The section 154 includes, or otherwise provides, a service point 182 of the exhaust system 100 for servicing and/or maintenance. The section 156 extends, and is coupled between, the section 154 and the muffler 160. The section 156 is not arranged parallel to the linear axis LA. In some embodiments, the section 156 may be arranged orthogonal to, or substantially orthogonal to, the linear axis LA. In such embodiments, the section 156 may include, or otherwise be coupled to, an elbow 258.

In the illustrative embodiment, two hangers or retainers 180 are affixed to the section 154 of the conduit 152. The hangers 180 are spaced from one another along the section 154 such that one hanger 180 is arranged between the heat exchanger 140 and the service point 182 and another hanger 180 is arranged between the service point 182 and the section 156 of the conduit 152. Of course, in other configurations, it should be appreciated that the hangers 180 may have another suitable arrangement along the section 154 or along the sections 154, 156. In any case, each of the hangers 180 includes, or is otherwise embodied as, a mount for securing the piping assembly 150 and/or the exhaust system 100 to a vehicle.

The illustrative piping assembly 170 includes one or more components that establish a fluidic coupling between the muffler 160 and the exhaust outlet 104. The piping assembly 170 includes one or more conduits 172 fluidly coupled to the muffler 160 and a tailpipe 174 fluidly coupled to the conduit 172. In some embodiments, the tailpipe 174 may define, or otherwise include, the exhaust outlet 104.

In the illustrative embodiment, the exhaust system 100 does not include a resonator that is positioned between the service point 182 and the exhaust outlet 104. Even more, in the illustrative embodiment, the exhaust system 100 omits a resonator altogether. Consequently, at least in some embodiments, the illustrative exhaust system 100 may include fewer components than other configurations, such as the configuration described below with reference to FIG. 6, for example, which may be beneficial from the standpoint of design complexity, cost, ease of manufacturing, and packaging, among other things.

Figure 2:
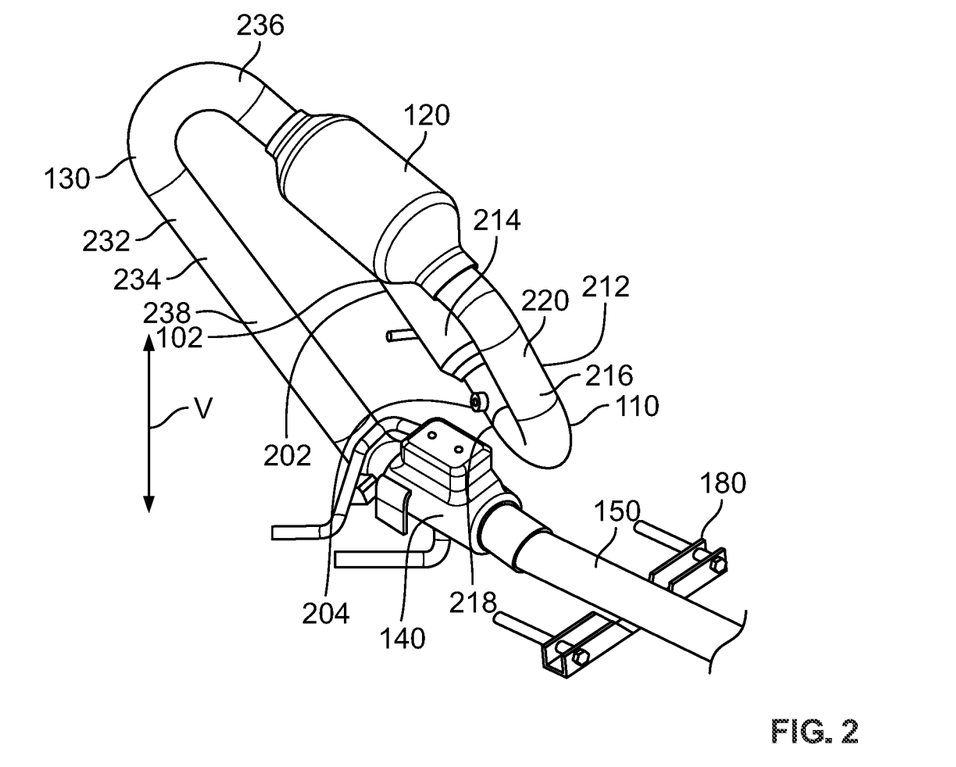
FIG. 2 is a magnified perspective view of one portion of the vehicle exhaust system shown in FIG. 1.

Referring now to FIG. 2, the piping assemblies 110, 130, and the loops 212, 232 respectively defined by the assemblies 110, 130, are shown in greater detail. The piping assembly 110 includes a flexible tube or flexible component 214 and at least one conduit 216 coupled to the tube 214. The flexible tube 214 and the at least one conduit 216 at least partially define the loop 212 between the exhaust inlet 102 and the catalytic converter 120. The piping assembly 130 includes at least one conduit 234 that at least partially defines the loop 232 between the catalytic converter 120 and the heat exchanger 140.

In the illustrative embodiment, the at least one conduit 216 has a section 218 and a section 220. The section 218 at least partially extends downwardly in the vertical direction V from the flexible tube 214 to the section 220. The section 220 at least partially extends upwardly in the vertical direction V from the section 218 to the catalytic converter 120.

In the illustrative embodiment, the at least one conduit 234 has a section 236 and a section 238. The section 236 at least partially extends upwardly in the vertical direction V from the catalytic converter 120 to the section 238. The section 238 at least partially extends downwardly in the vertical direction V from the section 236 to the heat exchanger 140.

In the illustrative embodiment, a flange (not shown) located in close proximity to the exhaust inlet 102 defines a service point 202 that provides access to the exhaust system 100 for servicing and/or maintenance. The illustrative service point 202 is located upstream of the flexible tube 214 of the piping assembly 110. Additionally, the service point 202 is located upstream of the service point 182.

The illustrative exhaust system 100 includes an oxygen sensor 204 to measure oxygen contents of combustion products passed through the piping assembly 110. The oxygen sensor 204 is affixed to the section 218 of the at least one conduit 216. As a result, the oxygen sensor 204 is positioned downstream of the flexible tube 214 and the exhaust inlet 102.

Figure 3:
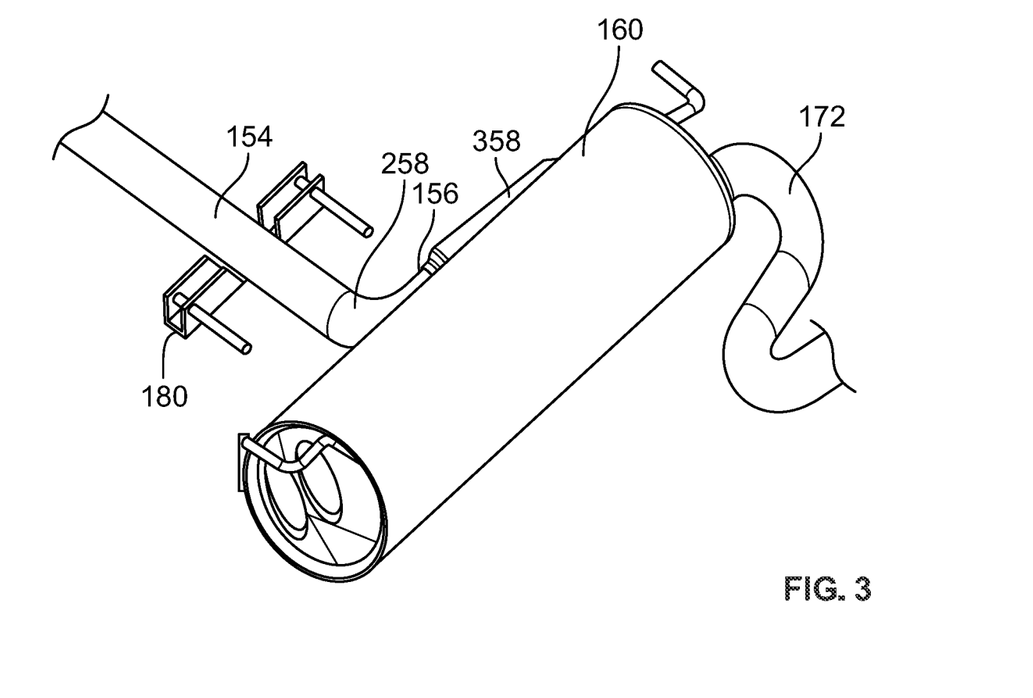
FIG. 3 is a magnified perspective view of another portion of the vehicle exhaust system shown in FIG. 1.

Referring now to FIG. 3, a portion of the piping assembly 150 is shown in greater detail. The illustrative piping assembly 150 includes a flexible tube or flexible component 358 that is coupled between the section 156 of the conduit 152 and the muffler 160. Like the section 156, the flexible tube 358 is not arranged parallel to the linear axis LA. In some embodiments, the flexible tube 358 may be arranged orthogonal to, or substantially orthogonal to, the linear axis LA.

Figure 4:
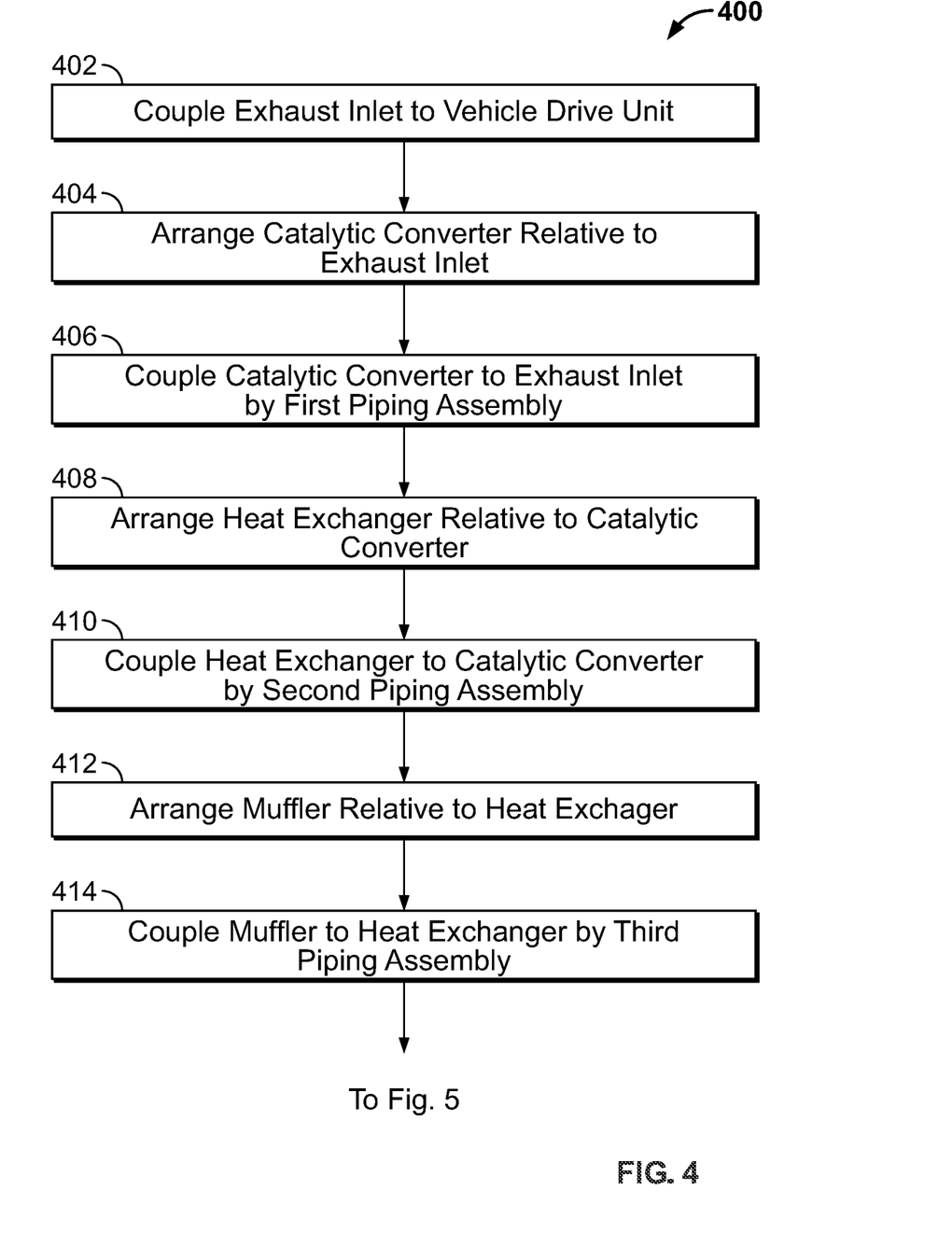
FIG. 4 is a simplified flowchart of one portion of a method of installing an exhaust system on a vehicle.
Figure 5:
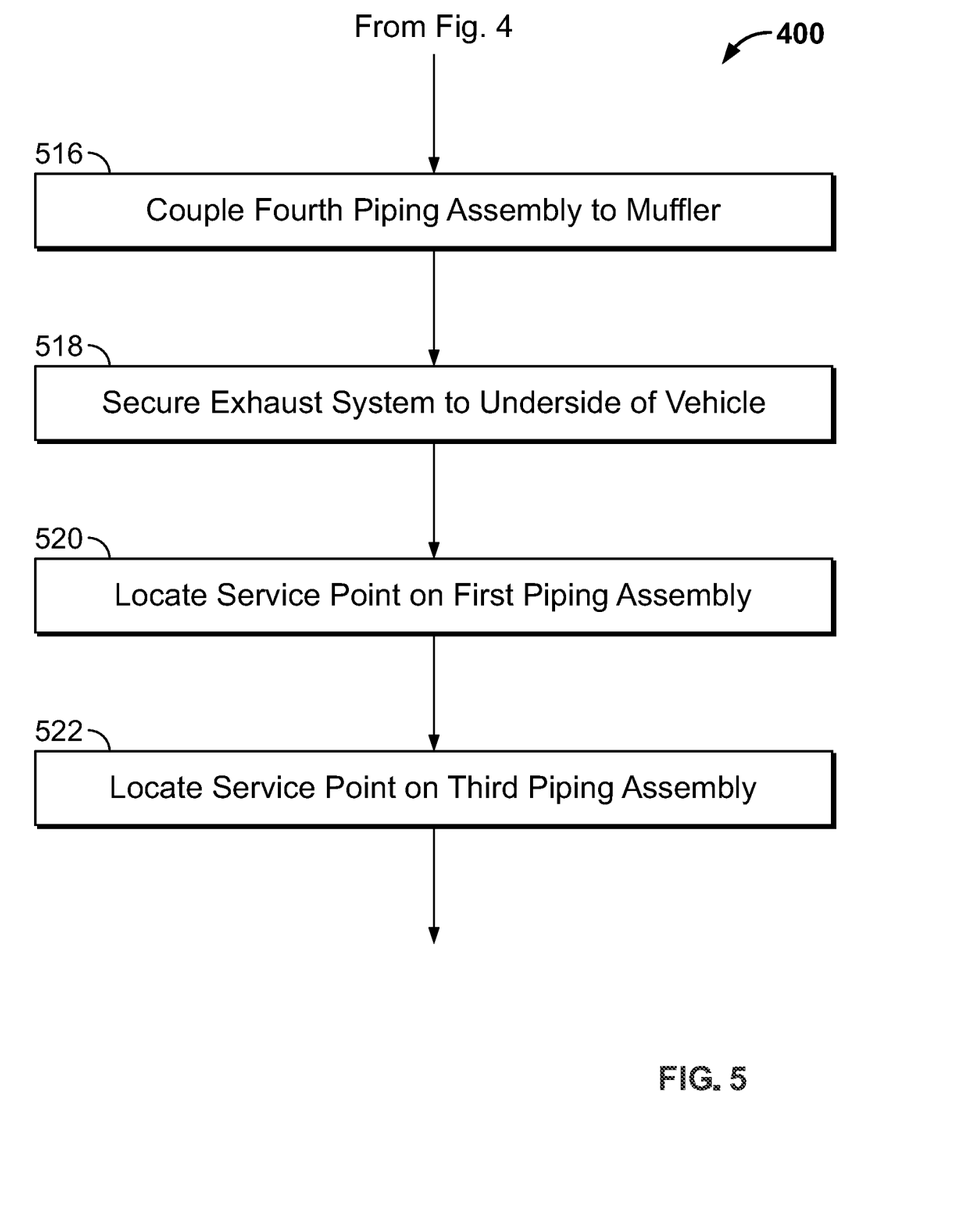
FIG. 5 is a simplified flowchart of another portion of the method shown in FIG. 4.

Referring now to FIGS. 4 and 5, a method 400 of installing the exhaust system 100 on a vehicle is diagrammatically depicted. The method 400 corresponds to, or is otherwise associated with, performance of the blocks described below in the illustrative sequence of FIGS. 4 and 5. It should be appreciated, however, that the method 400 may be performed in one or more sequences different from the illustrative sequence.

The illustrative method 400 begins with block 402. In block 402, the exhaust inlet 102 is coupled to a drive unit, engine, power plant, or the like of a vehicle. In some embodiments, in block 402, the exhaust inlet 102 is coupled to a vehicle drive unit to define the service point 202 for servicing and/or maintenance. From block 402, the method 400 subsequently proceeds to block 404.

In block 404 of the illustrative method 400, the catalytic converter 120 is arranged relative to the exhaust inlet 102. More specifically, in block 404, the catalytic converter 120 is arranged relative to the exhaust inlet 102 such that the catalytic converter 120 is at least partially positioned above the exhaust inlet 102 in the vertical direction V. From block 404, the method 400 subsequently proceeds to block 406.

In block 406 of the illustrative method 400, the catalytic converter 120 is coupled to the exhaust inlet 102 by the piping assembly 110. As a result, the piping assembly 110 defines the loop 212 between the exhaust inlet 102 and the catalytic converter 120 that at least partially extends downwardly in the vertical direction V from the exhaust inlet 102 and upwardly in the vertical direction V to the catalytic converter 120. From block 406, the method 400 subsequently proceeds to block 408.

In block 408 of the illustrative method 400, the heat exchanger 140 is arranged relative to the catalytic converter 120. More specifically, in block 408, the heat exchanger 140 is arranged relative to the catalytic converter 120 such that the heat exchanger 140 is at least partially positioned below the catalytic converter 120 in the vertical direction V. From block 408, the method 400 subsequently proceeds to block 410.

In block 410 of the illustrative method 400, the heat exchanger 140 is coupled to the catalytic converter 120 by the piping assembly 130. As a result, the piping assembly 130 defines the loop 232 between the catalytic converter 120 and the heat exchanger 140 that at least partially extends upwardly from the catalytic converter 120 in the vertical direction V and downwardly in the vertical direction V to the heat exchanger 140. From block 412, the method 400 subsequently proceeds to block 412.

In block 412 of the illustrative method 400, the muffler 160 is arranged relative to the heat exchanger 140. More specifically, in block 412, the muffler 160 is arranged downstream of the heat exchanger 140 and spaced from the heat exchanger 140 to permit the piping assembly 150 to be coupled between the heat exchanger 140 and the muffler 160. From block 412, the method 400 subsequently proceeds to block 414.

In block 414 of the illustrative method 400, the muffler 160 is coupled to the heat exchanger 140 by the piping assembly 150. Consequently, the muffler 160 is coupled to the heat exchanger 140 by the piping assembly 150 such that the service point 182 is located on the conduit 152 of the piping assembly 150. From block 414, the method 400 subsequently proceeds to block 516.

In block 516 of the illustrative method 400, the piping assembly 170 is coupled to the muffler 160. As a result, the piping assembly 170 defines the exhaust outlet 104 of the exhaust system 100. In the illustrative embodiment, coupling the piping assembly 170 to the muffler 160 does not include interposing a resonator between the muffler 160 and the exhaust outlet 104. From block 516, the method 400 subsequently proceeds to block 518.

In block 518 of the illustrative method 400, the exhaust system 100 is secured to the underside of the vehicle. It should be appreciated that in some embodiments, to perform block 518, the piping assembly 150 is secured to the underside of the vehicle using the hangers 180. From block 518, the method 400 subsequently proceeds to block 520.

In block 520 of the illustrative method 400, the service point 202 is located on the piping assembly 110. More specifically, in block 520, the service point 202 is located on the piping assembly 110 in close proximity to the exhaust inlet 102 and upstream of the flexible tube 214. From block 520, the method 400 subsequently proceeds to block 522.

In block 522 of the illustrative method 400, the service point 182 is located on the piping assembly 150. More specifically, in block 522, the service point 182 is located on the section 154 of the conduit 152 of the piping assembly 150.

Figure 6:
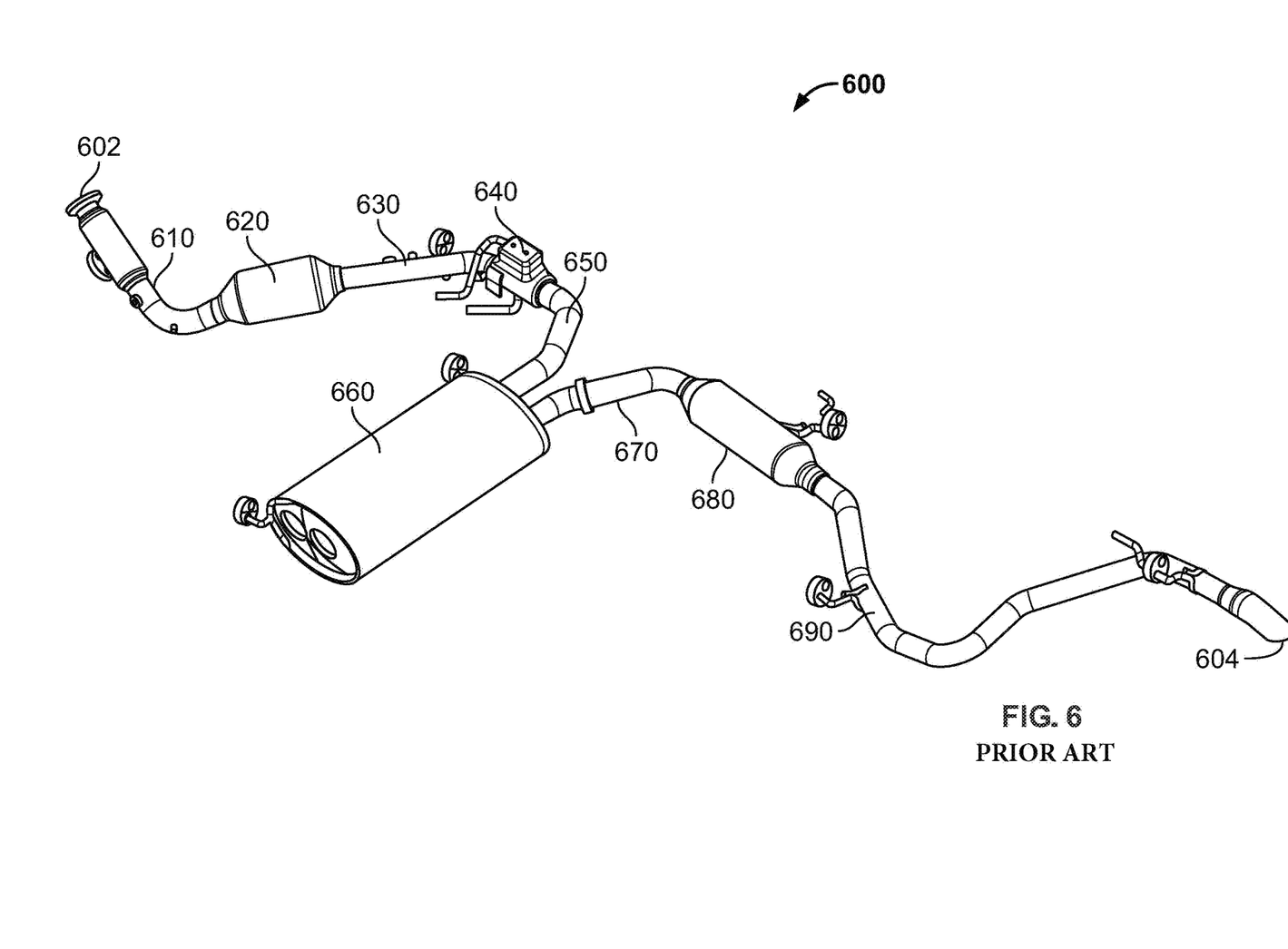
FIG. 6 is a perspective view of a conventional vehicle exhaust system.

Referring now to FIG. 6, a conventional exhaust system 600 includes a piping assembly 610, a catalytic converter 620, a piping assembly 630, a heat exchanger 640, a piping assembly 650, a muffler 660, a piping assembly 670, a resonator 680, and a piping assembly 690. The piping assembly 610 is coupled to an exhaust inlet 602 and the catalytic converter 620 to conduct combustion products from the exhaust inlet 602 to the catalytic converter 620. The catalytic converter 620 is configured to control emissions from the combustions products received by the exhaust system 600. The piping assembly 630 is coupled to the catalytic converter 620 and the heat exchanger 640 to conduct combustion products from the catalytic converter 620 to the heat exchanger 640. The heat exchanger 640 is configured to cool the combustion products received by the exhaust system 600. The piping assembly 650 is coupled to the heat exchanger 640 and the muffler 660 to conduct combustion products from the heat exchanger 640 to the muffler 660. The muffler 660 is configured to reduce sound associated with combustion products received by the exhaust system 600. The piping assembly 670 is coupled to the muffler 660 and the resonator 680 to conduct combustion products from the muffler 660 to the resonator 680. The resonator 680 is configured to modulate sound associated with combustion products received by the exhaust system 600. The piping assembly 690 is coupled to the resonator 680 to conduct combustion products from the resonator 680 to an exhaust outlet 604 of the exhaust system 600.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An exhaust system for a vehicle having a ground clearance defined along a vertical direction between an underside of the vehicle and a ground, the vertical direction being generally normal to the underside and the ground, the exhaust system comprising:
   an exhaust inlet to receive combustion products from a drive unit;
   a catalytic converter to control emissions from the combustion products received by the exhaust system; and
   a first piping assembly coupled to the exhaust inlet and the catalytic converter, wherein the first piping assembly includes a flexible tube and at least one conduit coupled thereto that cooperate to at least partially define a first loop between the exhaust inlet and the catalytic converter, and wherein the at least one conduit has one section that at least partially extends downwardly in the vertical direction from the flexible tube and another section that at least partially extends upwardly in the vertical direction from the one section to the catalytic converter;
   wherein the catalytic converter is positioned at least partially above the exhaust inlet in the vertical direction.

2. The exhaust system of claim 1, further comprising:
   a heat exchanger to extract heat from the combustion products received by the exhaust system; and,
   a second piping assembly coupled to the catalytic converter and the heat exchanger, wherein the second piping assembly includes at least one conduit that at least partially defines a second loop between the catalytic converter and the heat exchanger.

3. The exhaust system of claim 2, wherein the at least one conduit of the second piping assembly has one section that at least partially extends upwardly in the vertical direction from the catalytic converter and another section that at least partially extends downwardly in the vertical direction from the one section of the at least one conduit of the second piping assembly to the heat exchanger.

4. The exhaust system of claim 2, wherein the catalytic converter is positioned at least partially above the heat exchanger in the vertical direction.

5. The exhaust system of claim 2, further comprising:
   a muffler to reduce sound associated with the combustion products received by the exhaust system; and
   a third piping assembly coupled to the muffler and the heat exchanger, wherein a service point that provides access to the exhaust system for servicing and/or maintenance is located on at least one conduit of the third piping assembly.

6. The exhaust system of claim 5, wherein the exhaust system does not include a resonator that is positioned between the service point and an exhaust outlet of the exhaust system.

7. The exhaust system of claim 5, wherein the at least one conduit of the third piping assembly includes one section that at least partially extends along, and is arranged at least partially parallel to, a linear axis between the heat exchanger and the muffler, and wherein the service point is located on the one section of the at least one conduit of the third piping assembly.

8. The exhaust system of claim 7, wherein the at least one conduit of the third piping assembly includes another section coupled between the one section of the at least one conduit of the third piping assembly and the muffler, and wherein the another section of the at least one conduit of the third piping assembly is not arranged parallel to the linear axis.

9. The exhaust system of claim 8, wherein the third piping assembly includes a flexible tube coupled between the another section of the at least one conduit of the third piping assembly and the muffler.

10. The exhaust system of claim 1, further comprising a sensor to measure oxygen contents of the combustion products passed through the first piping assembly, wherein the sensor is affixed to the one section of the at least one conduit of the first piping assembly.

11. The exhaust system of claim 1, further comprising:
a heat exchanger to extract heat from the combustion products received by the exhaust system, wherein the heat exchanger is positioned at least partially below the catalytic converter in the vertical direction; and
a second piping assembly coupled to the catalytic converter and the heat exchanger, wherein the second piping assembly includes at least one conduit that at least partially defines a second loop between the catalytic converter and the heat exchanger, and wherein the second loop at least partially extends upwardly from the catalytic converter in the vertical direction and downwardly in the vertical direction to the heat exchanger.

12. The exhaust system of claim 11, further comprising a sensor to measure oxygen contents of the combustion products passed through the first piping assembly, wherein the sensor is affixed to the first piping assembly downstream of the flexible tube on a section of the first loop that at least partially extends downwardly in the vertical direction.

13. The exhaust system of claim 11, further comprising:
a muffler to reduce sound associated with the combustion products received by the exhaust system; and
a third piping assembly coupled to the muffler and the heat exchanger, wherein a first service point that provides access to the exhaust system for servicing and/or maintenance is located on at least one conduit of the third piping assembly.

14. The exhaust system of claim 13, wherein a second service point that provides access to the exhaust system for servicing and/or maintenance is located in close proximity to the exhaust inlet and upstream of the flexible tube of the first piping assembly.

15. The exhaust system of claim 13, wherein the at least one conduit of the third piping assembly includes one section that at least partially extends along, and is arranged at least partially parallel to, a linear axis between the heat exchanger and the muffler, and wherein the first service point is located on the one section of the at least one conduit of the third piping assembly.

16. The exhaust system of claim 15, wherein the at least one conduit of the third piping assembly includes another section coupled between the one section of the at least one conduit of the third piping assembly and the muffler, and wherein the another section of the at least one conduit of the third piping assembly is not arranged parallel to the linear axis.

17. The exhaust system of claim 16, wherein the third piping assembly includes a flexible tube coupled between the another section of the at least one conduit of the third piping assembly and the muffler.

18. A method of installing an exhaust system on a vehicle having a ground clearance defined along a vertical direction between an underside of the vehicle and a ground, the vertical direction being generally normal to the underside and the ground, the method comprising:
coupling an exhaust inlet of the exhaust system to a drive unit of the vehicle;
arranging a catalytic converter of the exhaust system relative to the exhaust inlet such that the catalytic converter is at least partially positioned above the exhaust inlet in the vertical direction; coupling the catalytic converter to the exhaust inlet by a first piping assembly defining a first loop between the exhaust inlet and the catalytic converter that at least partially extends downwardly in the vertical direction from the exhaust inlet and upwardly in the vertical direction to the catalytic converter;
arranging a heat exchanger of the exhaust system relative to the catalytic converter such that the heat exchanger is at least partially positioned below the catalytic converter in the vertical direction; and
coupling the heat exchanger to the catalytic converter by a second piping assembly defining a second loop between the heat exchanger and the catalytic converter that at least partially extends upwardly from the catalytic converter in the vertical direction and downwardly in the vertical direction to the heat exchanger.

19. The method of claim 18, further comprising coupling the heat exchanger to a muffler of the exhaust system by a third piping assembly such that a first service point that provides access to the exhaust system for servicing and/or maintenance is located on at least one conduit of the third piping assembly.

20. The method of claim 18, further comprising locating a first service point that provides access to the exhaust system for servicing and/or maintenance in close proximity to the exhaust inlet and upstream of a flexible tube of the first piping assembly.

21. An exhaust system for a vehicle having a ground clearance defined along a vertical direction between an underside of the vehicle and a ground, the vertical direction being generally normal to the underside and the ground, the exhaust system comprising:
an exhaust inlet to receive the combustion products from a drive unit;
a catalytic converter to control emissions from combustion products received by the exhaust system;
a first piping assembly coupled to the exhaust inlet and the catalytic converter that at least partially defines a first loop between the exhaust inlet and the catalytic converter;
wherein the first piping assembly has one section that at least partially extends downwardly in the vertical direction from the exhaust inlet and another section that at least partially extends upwardly in the vertical direction from the one section to the catalytic converter;
wherein the first piping assembly is routed such that the catalytic converter is positioned at least partially above the exhaust inlet in the vertical direction.

22. The exhaust system of claim 21, further comprising:
a heat exchanger to extract heat from the combustion products received by the exhaust system;
a second piping assembly coupled to the catalytic converter and the heat exchanger that at least partially defines a second loop between the catalytic converter and the heat exchanger;

wherein the second piping assembly has one section that at least partially extends upwardly in the vertical direction from the catalytic converter and another section that at least partially extends downwardly in the vertical direction from the one section of the second piping assembly to the heat exchanger.

23. The exhaust system of claim 22, wherein the second piping assembly is routed such the catalytic converter is positioned at least partially above the heat exchanger in the vertical direction.

* * * * *